United States Patent [19]

Jones et al.

[11] 4,352,063

[45] Sep. 28, 1982

[54] SELF-CALIBRATING SPEEDOMETER/ODOMETER

[76] Inventors: Peter W. J. Jones, 70 Oakley Rd., Belmont, Mass. 02178; Dennis W. Purcell, 121 Allston St., Medford, Mass. 02155

[21] Appl. No.: 261,759

[22] Filed: May 8, 1981

[51] Int. Cl.³ .................. G01P 3/48; G01P 3/54
[52] U.S. Cl. .................. 324/171; 324/168; 324/174; 340/671
[58] Field of Search .............. 324/171, 174, 168; 340/671; 73/519

[56] References Cited

U.S. PATENT DOCUMENTS

| | | | |
|---|---|---|---|
| 2,669,669 | 2/1954 | Spaulding | 324/174 X |
| 3,417,289 | 12/1968 | Jensen | 324/168 X |
| 3,716,787 | 2/1973 | Hammond | |
| 3,898,563 | 8/1975 | Erisman | |
| 4,007,419 | 2/1977 | Jasmine | |
| 4,074,196 | 2/1978 | Webster | |
| 4,156,190 | 5/1979 | Chittenden | 324/168 X |

FOREIGN PATENT DOCUMENTS 1315442  5/1973  United Kingdom .............. 324/168

OTHER PUBLICATIONS

Hanson, Double Frequency Pulse Aplifier, IBM Technical Disclosure Bulletin, Oct. 1966, pp. 536,537.
Mereness, Bicycle Tachometer/Speedometer, IBM Technical Disclosure Bulletin, Feb. 1975, pp. 2570, 2571.
P de Jong, Bicycle Speedometer, Elector Jul./Aug. 1979, pp. 7–69, 7–70.

Primary Examiner—Stanley T. Krawczewicz
Attorney, Agent, or Firm—Robert F. O'Connell

[57] ABSTRACT

A speedometer/odometer system for use on a bicycle which system uses a magnet/coil arrangement and a signal processing means for providing a count of the spokes of a wheel as they pass the magnet/coil arrangement the count being determined over a selected time period to provide a digital signal speed indication or being cumulatively counted to provide a digital signal indication of distance travelled. The system can be easily calibrated by using means for producing a calibration constant which can be used to multiply the digital signals and the resultant signal supplied to a suitable digital display means for visually displaying the speed or distance for the rider.

12 Claims, 6 Drawing Figures

SELF-CALIBRATING SPEEDOMETER/ODOMETER

INTRODUCTION

This invention relates generally to speedometer/odometer devices and, more particularly, to self-calibrating speedometer/odometer devices for use on vehicles, such as bicycles.

BACKGROUND OF THE INVENTION

Devices for measuring speed and/or distance of travel on vehicles, such as bicycles, have been available for many years. Most such devices are purely mechanical in nature and utilize front wheel mounted mechanical units and a cable to actuate conventional mechanical speedometer/odometer counting devices. Such systems are generally inefficient and provide undesirable weight or pressure on the wheel so as to create unnecessary drag thereon. Further, such mechanical devices are subject to malfunctions and require a reasonably high degree of maintenance and repair.

Efforts to improve over such conventional mechanical devices have been tried by those in the art. For example, the device described in U.S. Pat. No. 3,898,563, issued on Aug. 5, 1975 to D. E. Erisman, utilizes one or more magnets symmetrically attached to the drive sprocket of the bicycle and a coil attached to the bicycle frame. Alternatively, the Erisman device utilizes a plurality of magnets symmetrically attached to the spokes of the front or rear wheels, together with a sensor housing mounted on the wheel fork.

U.S. Pat. No. 4,007,419, issued on Feb. 8, 1977 to R. Jasmine, describes the use of coil mounted on a wheel fork and a plurality of magnets mounted on the wheel sprocket which generate a voltage which is processed to provide an indication of the speed or distance the vehicle has travelled.

In each of the aforesaid issued patents a magnet is placed on the spokes and thereby extra, and undesirable, weight is added to the wheel which would be detrimental to the balance of the wheel and would increase the moment of inertia thereof.

U.S. Pat. No. 4,156,190, issued May 22, 1970 to B. C. Chittendent et al. discloses a system wherein each spoke or valve stem interrupts a light beam from a light-emitting diode which is in alignment with a phototransistor, the latter device being mounted on the wheel frame. The number of light beam interruptions is utilized to compute the speed and/or distance of travel of the vehicle. Such a device introduces complicated alignment problems between the light-emitting diode and the phototransistor arrangement and such system is highly susceptible to false signals. Moreover, the device has a relatively large number of components, such components not only increasing the cost thereof but also requiring a relatively large amount of power necessitating the use of a relatively heavy battery power source.

It is desirable, therefore, to provide a bicycle speedometer/odometer system in which no weight is added to, and no pressure is applied to, the wheel itself and which is not affected by dirt or mud which may accumulate on the sensor or by reflections from the wheel or spokes thereof and provide spurious readings. Such a device should provide high measurement accuracy, be relatively simple to install, be less susceptible to spurious signals, and require no complicated alignment procedures. Further, such a device should be relatively easy to calibrate and provide effective operation at a relatively low cost.

BRIEF SUMMARY OF THE INVENTION

The speedometer/odometer device in accordance with the invention provides for a relatively easy to install system which has high accuracy and which is arranged to be self-calibrating. The device utilizes a magnet positioned on the bike frame adjacent the spokes of a selected one of the wheels thereof (e.g., the front wheel). The magnet is arranged to generate a magnetic field in such a manner that each spoke passing through the magnetic field generates a voltage pulse in the coil of the magnet. The voltage is supplied to a signal processing and display module which modifies the voltage pulse to a form suitable for use in electronic digital counting circuits, which circuits accumulate counts for use in distance measurement and for comparison with an appropriate time base to provide an instantaneous speed readout. Such information can be displayed either as an instantaneous speed display, as an average speed display, or as a distance travelled display.

The system thereof further provides a self-calibrating function wherein one end of the signal processing and display unit has an appropriate movable part, such as a roller or auxiliary wheel, which can be placed against the running surface of the bicycle wheel when the device is placed in its calibration mode. When the bicycle is moved, the device determines the average distance travelled per spoke so as to produce a calibration constant which can then be utilized in the calculation of both speed and distance values, as desired for display.

DESCRIPTION OF THE INVENTION

The invention can be described in more detail with the help of the accompanying drawings wherein FIG. 1 shows the principle components of the system of the invention as located on a bicycle;

Figure 1:
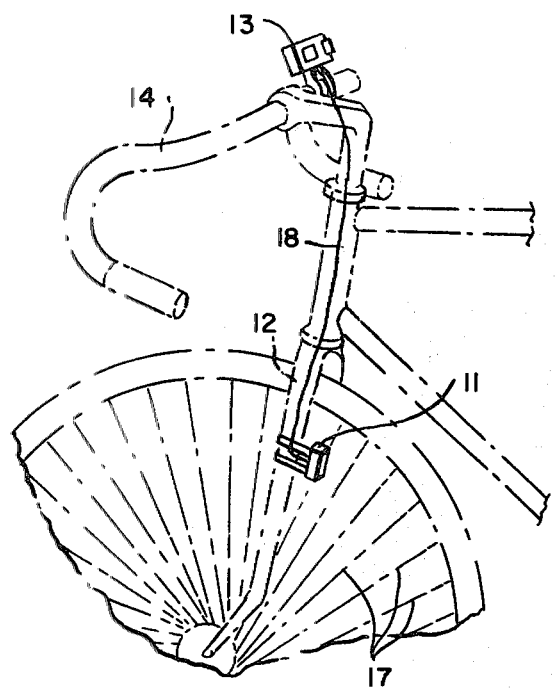
Figure 2:
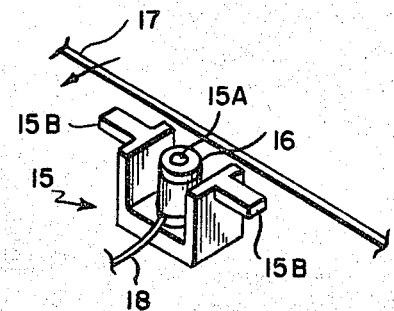
FIG. 2 shows the spoke detection unit of the system of the invention of FIG. 1.

FIG. 1 shows in dashed lines a portion of a bicycle 10 on which the speedometer/odometer system of the invention can be used. The device comprises two major portions which, in the embodiment depicted, include a detector unit 11 suitably mounted on the front fork 12 of the bicycle frame and a signal processor and display unit 13 mounted generally on the bicycle frame where it can be easily seen by the rider as, for example, on handle bar 14. The detector unit 11 as shown in more detail in FIG. 2 comprises a suitable magnet and coil arrangement 15 wherein the coil 16 is wound around center leg 15A, the remaining legs forming pole pieces 15B as shown. The overall arrangement can be embedded in a suitable plastic potting compound using well known techniques. Such unit can be appropriately configured so as to be mounted onto the frame of the bike, e.g., at fork 12. As the wheel rotates the spokes 17 thereof move through the magnetic field generated by magnet 15 and create an electrical signal in coil 16. The signal output from the coil is thereupon supplied via a two-wire cable 18 to the processor/display unit 13.

Figure 3:
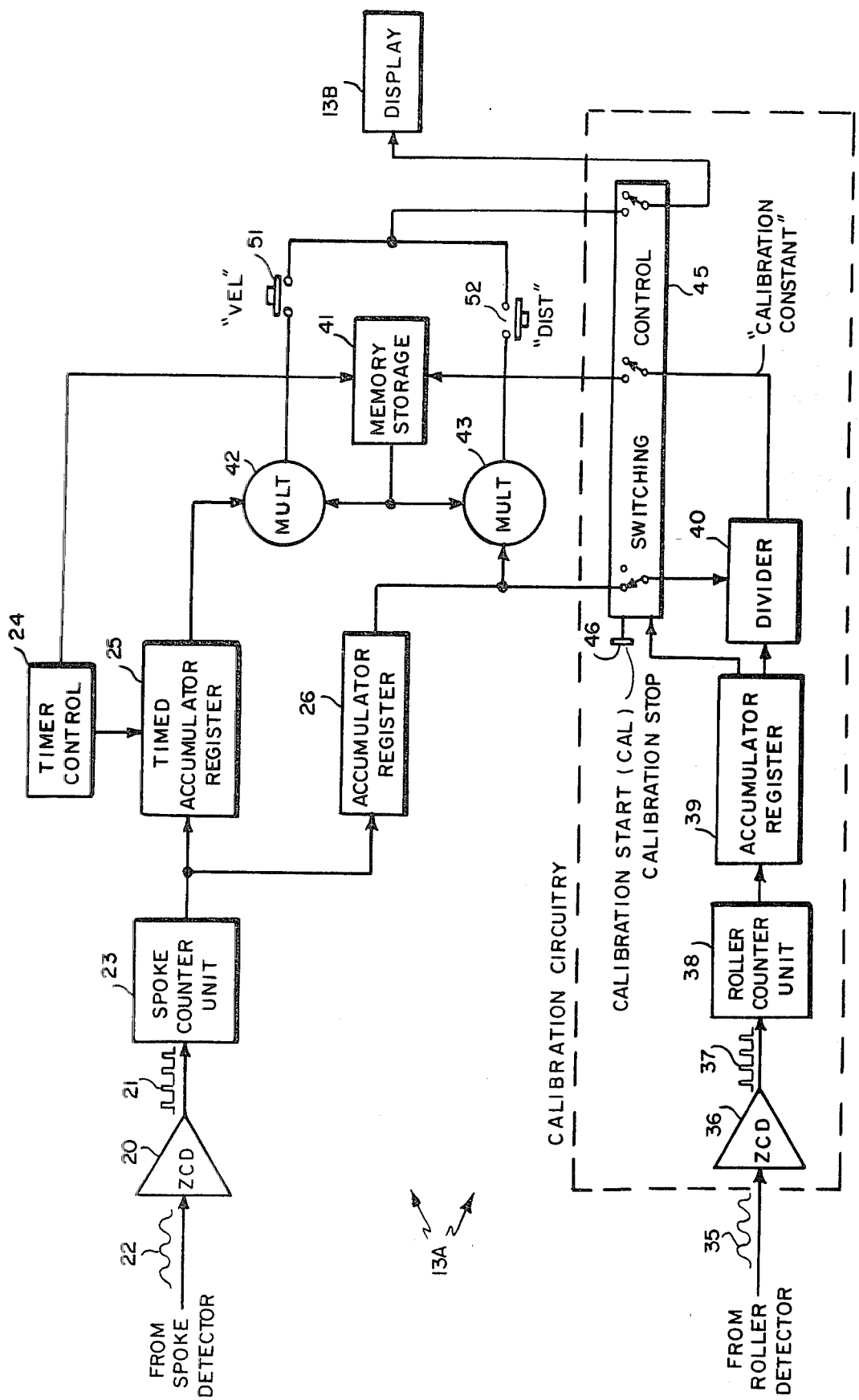
FIG. 3 shows a block diagram of the signal processing circuitry of the invention shown in FIG. 1.

The latter unit comprises the processor circuitry 13A shown in block diagram form in FIG. 3 and a display unit 13B. As can be seen, in an operating mode (as opposed to a calibration mode as discussed below), the output signal 22 from the coil 16 is supplied via cable 18 to a conventional zero-crossing detector (ZCD) circuit 20 which produces an output signal in the form of digital pulses 21 at each zero crossing of the coil signal from spoke detector unit 11. A suitable digital counter unit 23 counts the number of such pulses and supplies an output count to an accumulator register 23. The latter register is timed by a timer control circuit 24 to accumulate the number of such counts over a selected time period (e.g., one second), such number being proportional to the linear velocity of the moving vehicle. Such counts when multiplied at multiplier unit 42 by a suitably calculated calibration constant (as discussed below) provide an indication of the speed of the vehicle. Such count can also be cumulatively stored in a second accumulator register 26 to provide at any time a total count which is proportional to the distance travelled, such count when multiplied by the calibration constant at multiplier unit 43 providing an indication of the distance travelled. The speed or distance results are displayed on a suitable visual display unit 13B, e.g., a liquid crystal digital display unit, a meter, or the like, such display being updated once every selected time period.

The calibration constant is a calculated number which is equal to the mean effective tire length per spoke of the wheel on which the spoke detector unit 11 is mounted and can be determined automatically in a self-calibration mode of operation as disclosed in more detail below.

Figure 4:
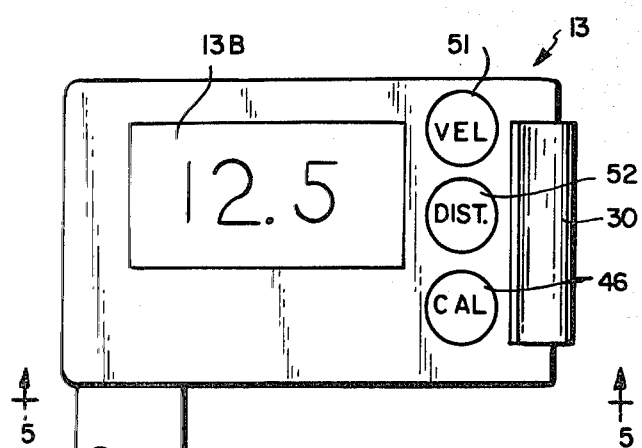
FIG. 4 shows the signal processing/display unit of the invention shown in FIG. 1.
Figure 6:
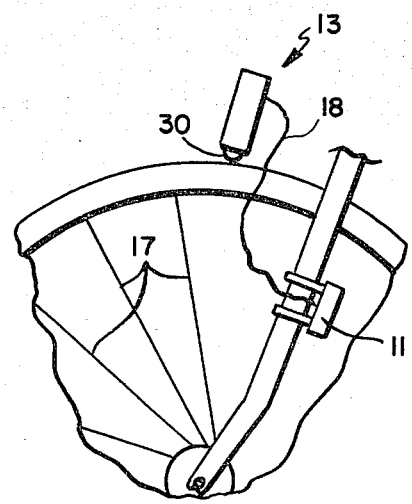
FIG. 6 depicts the technique for using the calibration detection elements of FIG. 5.
Figure 5:
FIG. 5 shows a view of the unit of FIG. 4 depicting the calibration detection elements of the invention.

A more detailed description of the exterior of an exemplary embodiment of the processor/display unit 13 of the invention is shown in FIG. 4, wherein the display output (e.g., an LCD digital display as depicted) is mounted so as to be made visible to the rider during use. For this purpose, the overall unit is described as being appropriately mounted on the handle bar 14 in the configuration depicted. The processor/display unit 13 can be readily made to be easily removable from its mounted position for use in a calibration mode. For the purpose of calibration a roller means 30 is mounted so as to be freely rotatable at one end of the processor/display unit 13 and, as shown in FIG. 5, a suitable built-in detector element 31 comprising a conventional cylindrical magnet and coil arrangement is mounted within the processor/display unit 13 adjacent roller means 30. A steel pin 34 is fixedly mounted within the roller 30 near the periphery thereof. When the overall system is to be calibrated, the processor/display unit 13 is removed from its mounted position and the roller means 30 is held against the surface of the tire of the bicycle wheel, as shown in FIG. 6.

The user performs the calibration function by moving the bicycle, the coil of detector element 31 thereby providing an output signal 35 as the pin 34 moves through the magnetic field created by the magnet of detector 31 as the roller 30 rotates against the moving tire. The calibration processing circuitry of processor/display unit 13 is shown in dashed lines in FIG. 3 and, as can be seen therein, the output signal 35 is supplied to a zero crossing detector (ZCD) 36 to produce a signal in the form of pulses 37 at each zero crossing thereof.

In the calibration mode, the user starts the operation by placing the roller 30 against the tire and initiates the calibration switching control unit manually by pushing the "CAL" button 46 on unit 13. Such action places the switches of switching control unit 40 in the positions shown. The latter unit is depicted schematically and can be embodied in any suitable manner within the skill of the art.

In such calibration mode, the pulse signals from the roller detector are counted by roller counter unit 38 and supplied to accumulator register 39, the latter register being arranged to provide a calibration stop signal when it has accumulated a pre-selected number of counts. The criterion for selection of the pre-selected counts is merely that the vehicle be moved a sufficient distance during calibration so as to provide a sufficient number of pulse counts to produce a desired accuracy. The calibration constant is determined by the ratio of the spoke counts to the roller counts. Accordingly, the outputs of register units 26 and 39, respectively, are supplied to a divider circuit 40, as shown.

When the accumulated count in accumulator register 39 reaches the pre-selected number (e.g., the accumulator reaches its "full" count) a control signal (calibration stop) is supplied to the switching control unit 45 so that the switches thereof are placed in their alternative positions. Accordingly, the calibration mode is completed and the current output of the divider circuit 40 is supplied to a memory storage unit 41 for later use in calculating the speed and distance values. During the calibration mode the input to the display unit 13B can be disabled as shown by switching control unit 45. The calibration constant which has been stored in memory storage unit 41 can be accessed during the operating mode for use in multiplying the output from accumulator register 25 at multiplier 42 (to measure speed) or for use in multiplying the output from accumulator register 26 at multiplier 43 (to measure distance). Once the calibration constant has been determined and suitably stored for use, the system is automatically always calibrated for the particular wheel which is used and the display unit can be remounted on the handle bar for subsequent use of the system. Such calibration constant need not be re-calculated until the wheel and/or tire is changed, although it can always be so recalculated if desired in the same manner. Once the calibration constant is so stored, the user need only actuate switches 51 or 52 to produce a display of the velocity or the distance travelled at display unit 13B, as desired.

While the particular circuitry as shown in FIG. 3 uses conventional and well-known discrete components (counters, multipliers, dividers, registers, etc.), the outputs from zero crossing detectors 20 and 36 can alternatively be supplied to an appropriate microprocessor integrated circuit chip which can be set up to perform the desired functions discussed above, using well-known digital data processing techniques, for supplying the calculated data to the display unit 13B. The use of an integrated circuit chip greatly reduces the size of the processor circuitry, and the design thereof for providing the aforesaid calculations is well within the skill of those in the art.

While the spoke detector unit 11 and the processor/display unit 13 are depicted in the above embodiment as separately fabricated so as to be placed at different locations on the vehicle, it would be well within the skill of the art to combine the two units into a single unit which can be mounted adjacent the wheel in such a manner that the rider could still see the display output reading with little or no real effort. Accordingly, the cost of fabrication thereof might be reduced.

While the specific embodiment of the invention shown and discussed herein represents a preferred embodiment of the invention, modifications thereto may occur to those in the art within the spirit and scope of the invention and, hence, the invention is not to be construed as limited to the particular embodiment described, except as defined by the appended claims.

What is claimed is:

1. An odometer/speedometer system for use on a spoke-wheeled vehicle comprising
   spoke magnet and coil detection means mounted on said vehicle near the spokes of a selected wheel thereof, the movement of said spokes passing by said detection means producing an output signal from the coil thereof;
   signal processing means being mounted on said vehicle and including
   means responsive to said coil output signal for producing a plurality of pulses each corresponding to the passage of a spoke by said detection means;
   spoke count means responsive to said spoke pulses for counting said pulses to produce a spoke count signal representing said pulse count;
   means responsive to said spoke count signal over a selected time period for producing a timed spoke count output signal proportional to the speed of the vehicle.

2. A system in accordance with claim 1 wherein said signal processing means further includes
   means responsive to said spoke count signal for producing a cumulative spoke count output signal proportional to the distance travelled by the vehicle.

3. A system in accordance with claim 2 and further including
   calibration detection means detachably mounted on said vehicle and comprising
   rotatable means for bearing against the selected wheel thereof; and
   further detection means responsive to the rotation of said rotatable means during motion of said selected wheel for producing a calibration signal therefrom;
   said signal processing means further including
   means responsive to said calibration signal for producing a plurality of calibration pulses corresponding to each rotation of said rotatable means;
   calibration count means responsive to said calibration pulses for counting said pulses to produce a calibration count signal representing said pulse count;
   means responsive to said calibration count signal and to said cummulative spoke count output signal for producing a calibration constant signal.

4. A system in accordance with claim 3 wherein said signal processing means further includes means for multiplying said timed spoke count signal by said calibration constant signal for producing first output signal representing the speed of the vehicle; and
   display means responsive to said first output signal for providing a visual display of said vehicle speed.

5. A system in accordance with claims 3 or 4 wherein said signal processing means further includes
   means for multiplying said cumulative spoke count signal by said calibration count signal for producing a second output signal representing the distance travelled by said vehicle; and
   said display means is responsive to said second digital output signal for providing a visual display of the distance travelled by said vehicle.

6. A system in accordance with claim 5 wherein said further detection means comprises
   pin means embedded in said rotatable means; and
   calibration magnet and coil means mounted adjacent said rotatable means and responsive to the rotation of said rotatable means for producing said calibration signal at said coil means.

7. A system in accordance with claim 1, wherein said spoke pulse producing means comprises a zero crossing detector for producing a pulse for each zero crossing of the output signal from the coil of said spoke magnet and coil means.

8. A system in accordance with claim 3 wherein said calibration pulse producing means comprises a zero crossing detector for producing a pulse for each zero crossing of the calibration signal from the coil of said calibration magnet and coil means.

9. A system in accordance with claim 3 wherein said signal processing means and said display means are formed as an integral unit being detachably mounted on said vehicle.

10. A system in accordance with claim 3 and further including means for storing said calibration constant signal whereby said stored calibration constant signal can be assessed when said signal is required for use in producing said first or second output signals.

11. A system in accordance with claim 3 and further including switching means capable of actuation to place said system into a calibration mode of operation when producing said calibration constant signal, into a speed measurement operating mode when producing said first output signal, and into a distance measurement operating mode when producing said second output signal.

12. A system in accordance with claim 3 wherein said signal processing means, other than said spoke pulse producing means and said calibration pulse producing means, is formed as an integrated circuit means.

* * * * *